United States Patent [19]

Nicodemus, Jr. et al.

[11] 4,114,538
[45] Sep. 19, 1978

[54] HANGING GOODS SORTER

[75] Inventors: Robert N. Nicodemus, Jr., Walkersville; James W. Bosler, Frederick; Marvin R. Kershner, Hagerstown, all of Md.

[73] Assignee: American Chain & Cable Company, Inc., Bridgeport, Conn.

[21] Appl. No.: 772,341

[22] Filed: Feb. 25, 1977

Related U.S. Application Data

[63] Continuation of Ser. No. 630,193, Nov. 10, 1975, abandoned.

[51] Int. Cl.$^2$ .................. B61B 10/00; B65G 17/32
[52] U.S. Cl. .................................. 104/88; 198/680
[58] Field of Search ............... 104/88; 214/11 C; 211/1.5, 162; 198/370, 473, 680, 678

[56] References Cited

U.S. PATENT DOCUMENTS

| 1,556,723 | 10/1925 | Shaffer | 198/680 |
| 3,152,682 | 10/1964 | Rutkovsky et al. | 104/88 X |
| 3,168,053 | 2/1965 | Miroux | 104/88 |
| 3,175,675 | 3/1965 | Sgriccia et al. | 104/88 X |
| 3,785,474 | 1/1974 | Nakamoto | 198/678 X |

Primary Examiner—Barry L. Kelmachter
Attorney, Agent, or Firm—Barnes, Kisselle, Raisch & Choate

[57] ABSTRACT

A hanging goods sorter comprising a power and free conveyor system including a power track, a power conveyor movable along the track, a free track movable along a portion of the power track, and a gravity track connected at one end to the free track and at the other end to a spaced portion of the free track. A plurality of carriers are movable on the tracks and each carrier has a plurality of longitudinally spaced supporting hooks thereon which can be individually actuated between a position for carrying hanging goods to a position for releasing hanging goods. A loading station and a coding station are provided along the gravity track. A plurality of delivery stations are provided along the portion of the free track which is along the power track. Release mechanisms are provided at fixed points adjacent the discharge stations for actuating the hooks to release the garments at predetermined stations. The release mechanisms are controlled by a computer to which signals are provided by an operator at the coding station.

25 Claims, 13 Drawing Figures

HANGING GOODS SORTER

This is a continuation of application Ser. No. 630,193, filed Nov. 10, 1975 now abandoned This invention relates to the handling of hanging goods such as garments.

BACKGROUND OF THE INVENTION

In the handling of hanging goods such as garments on hangers, it has heretofore been suggested that conveyor systems be provided for transporting the goods between stations and for discharging the goods at selected stations. It is desirable to provide such a system wherein the control of the position of the goods and the discharge thereof is more certain and wherein the goods are assured of their discharge at the required destination.

Among the objects of the invention are to provide a hanging goods sorter system wherein the goods can be loaded by an operator at one station, coded in terms of location on the carrier at another station with the coding information extending to a computer which will, in turn, discharge the hanging goods from the designated position on the carrier at predetermined destinations or locations along the system; which system utilizes a novel carrier which is readily manufactured, effective, and requires minimum maintenance; which system utilizes a novel indexing conveyor at the loading and coding stations; and which system includes novel means for preventing false signals from being entered at the coding station.

SUMMARY OF THE INVENTION

The hanging goods sorter embodying the invention comprises a power and free conveyor system including a power track, a power conveyor movable along the track, a free track movable along a portion of the power track, and a gravity track connected at one end to said free track and at the other end to a spaced portion of said free track. A plurality of novel carriers are provided for movement along the tracks and each carrier has a plurality of longitudinally spaced supporting hooks thereon and means on each said carrier for individually actuating said hooks between a position for carrying hanging goods to a position for releasing hanging goods. The garments are loaded onto carriers at a loading station along the gravity track and travel to a coding station along the gravity track where an operator indicates the position of a garment to a computer which in turn controls the release of the garments at one of a plurality of delivery stations along said portion of the free track which is along the power track. Release mechanisms are provided at fixed points adjacent the discharge stations for actuating the hooks to release the garments on individual hooks at predetermined stations. The release mechanisms are controlled by a computer to which signals are provided by an operator at the coding station.

DESCRIPTION

Figure 1:
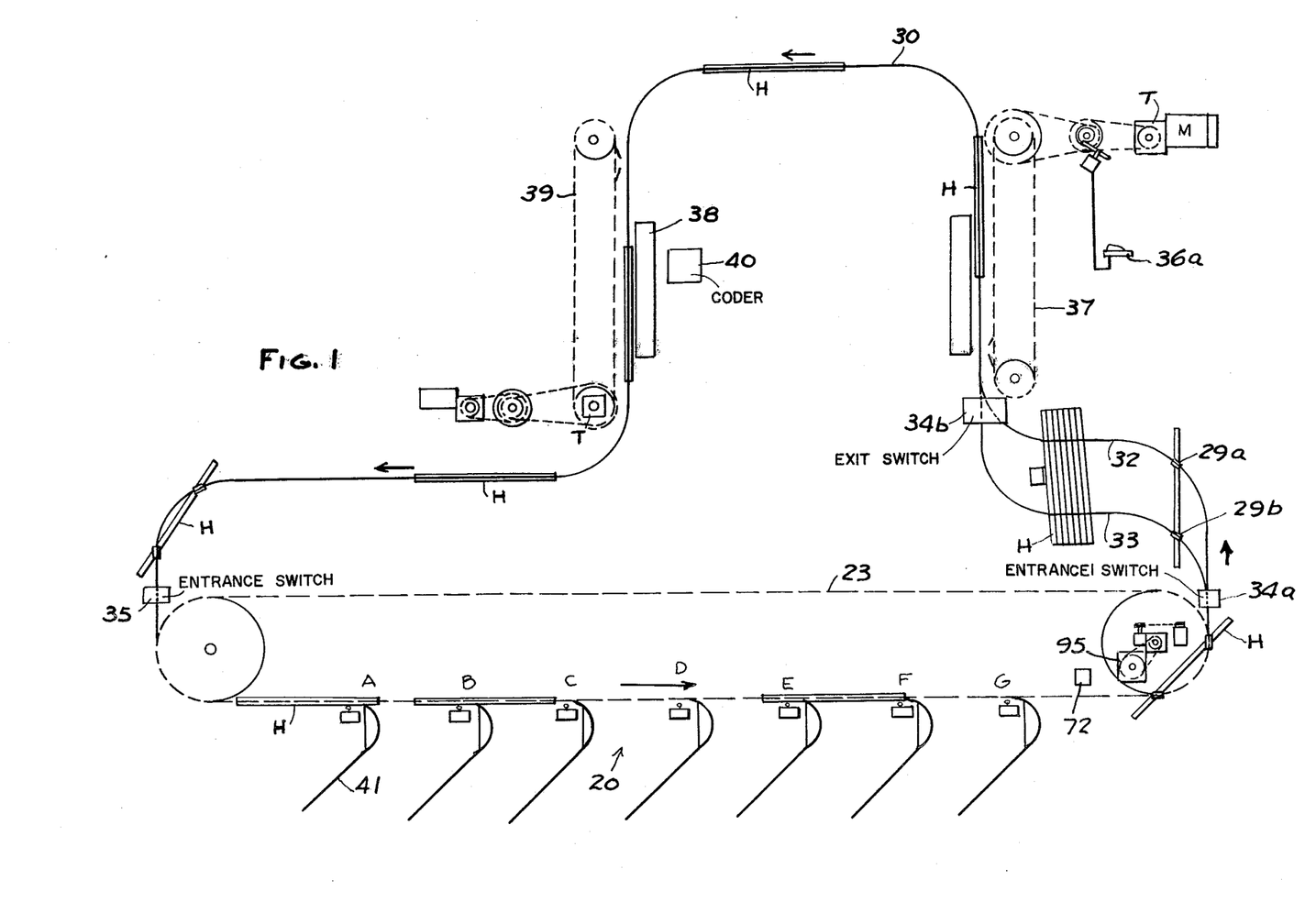
FIG. 1 is a diagrammatic view of a hanging goods sorter system embodying the invention.
Figures 6, 7, 8:
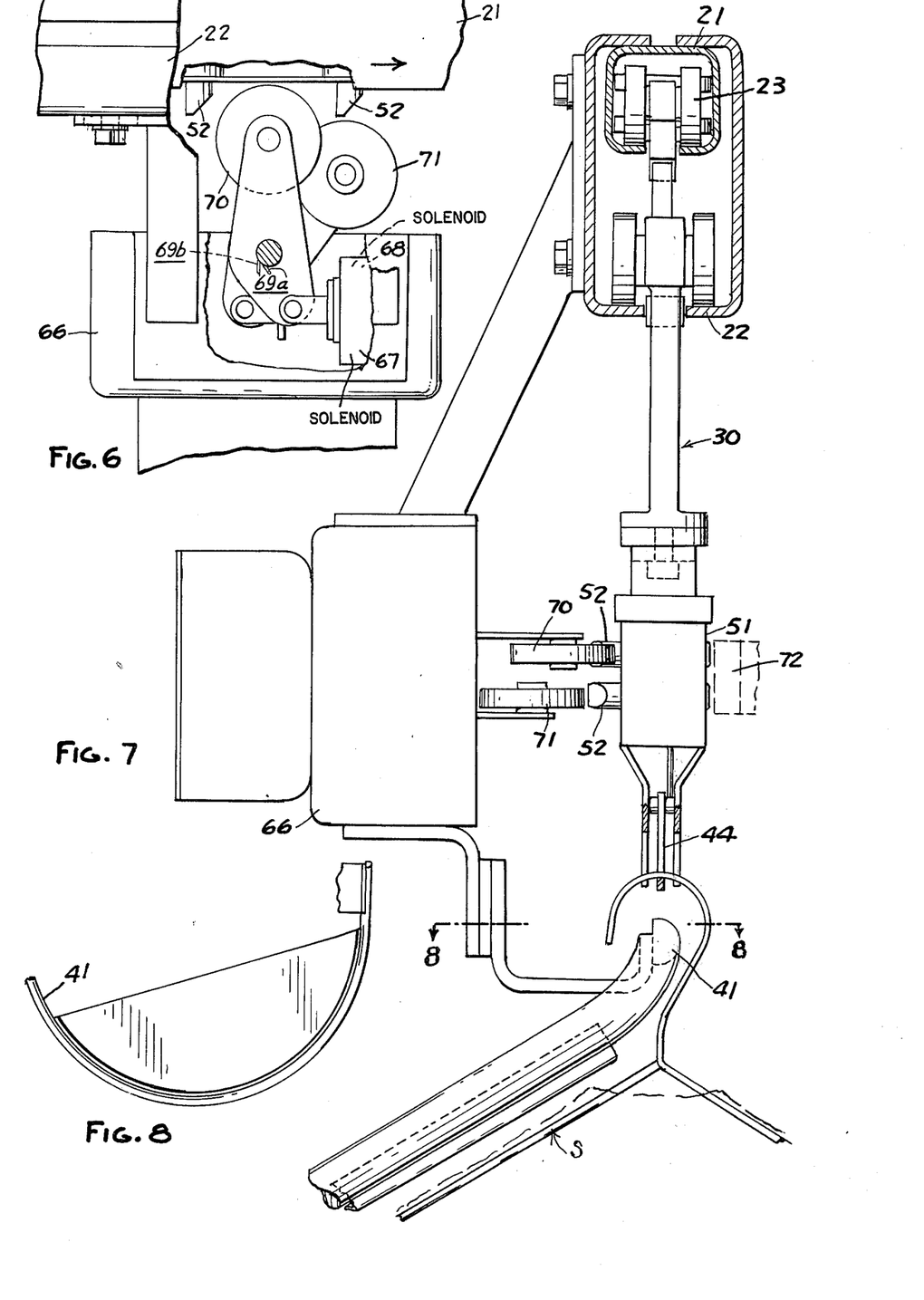
FIG. 6 is a fragmentary plan view of another portion of the system.
FIG. 7 is a part sectional view, parts being broken away, of a portion of the system shown in FIG. 6.
FIG. 8 is a fragmentary view taken along the line 8—8 in FIG. 7.

Referring to FIG. 1, the hanging goods sorter system embodying the invention comprises a power and free conveyor 20 which includes a power track 21 (FIG. 2) and a free track 22 that extends along a portion of the power track. In accordance with conventional power and free track construction, a power chain 23 is provided in the power track and a plurality of carriers 25 are adapted to be moved along the free track by interengagement between dogs 26, 27 on the power chain 23 and a dog 28 on one of the trolleys 29a, 29b of the carrier H. (FIG. 7)

The system further includes a gravity track 30 that has one end thereof connected to one end of the free track and the other end connected to the other end of the free track. The gravity track 30 includes a storage portion 31 including spaced tracks 32, 33 along which the trolleys 29a, 29b of each carrier H may move respectively to store the carriers H until they are needed. An entrance switch 34a is provided at the entrance to tracks 32, 33 to control movement of trolleys 29a, 29b to the respective tracks 32, 33. An exit switch 34b of conventional construction is provided at the outlet of the storage portion 31 and an entrance switch 35 of conventional construction is provded to selectively feed the carriers to the portion of the free track that extends along a portion of the power track, in accordance with conventional construction.

In addition, a loading station 36 is provided along the gravity track 30 at which an indexing conveyor 37 progressively stops and indexes each carrier to permit an operator to load hanging goods such as garments on hangers on the carrier. As the operator loads the hangers on the carrier, he depresses a foot pedal 36a to index the carrier. Further along the gravity track 30, a loading station 38 is provided with another indexing conveyor 39 to index the carrier past an operator at the coding station so that the operator can code the position of various goods through a coder 40 to a computer. The indexing conveyor is indexed automatically under computer control, as presently described.

Along the portion of the free track which is provided adjacent a portion of the power track, there are discharge stations, A, B, C, D, E, F and G including a receiving rail 41 at each station. As each carrier H moves past each station A-G, an appropriate release mechanism 42 is actuated under control of the computer to selectively discharge the hanging goods to the appropriate station A-G depending upon the code that has been entered at the coding station 38. In order to prevent interference in the movement of the goods along rail 41 by the plastic bag which is often placed on the goods, a deflector plate 41a is provided to subtend the curved portion of rail 41.

Figure 2:
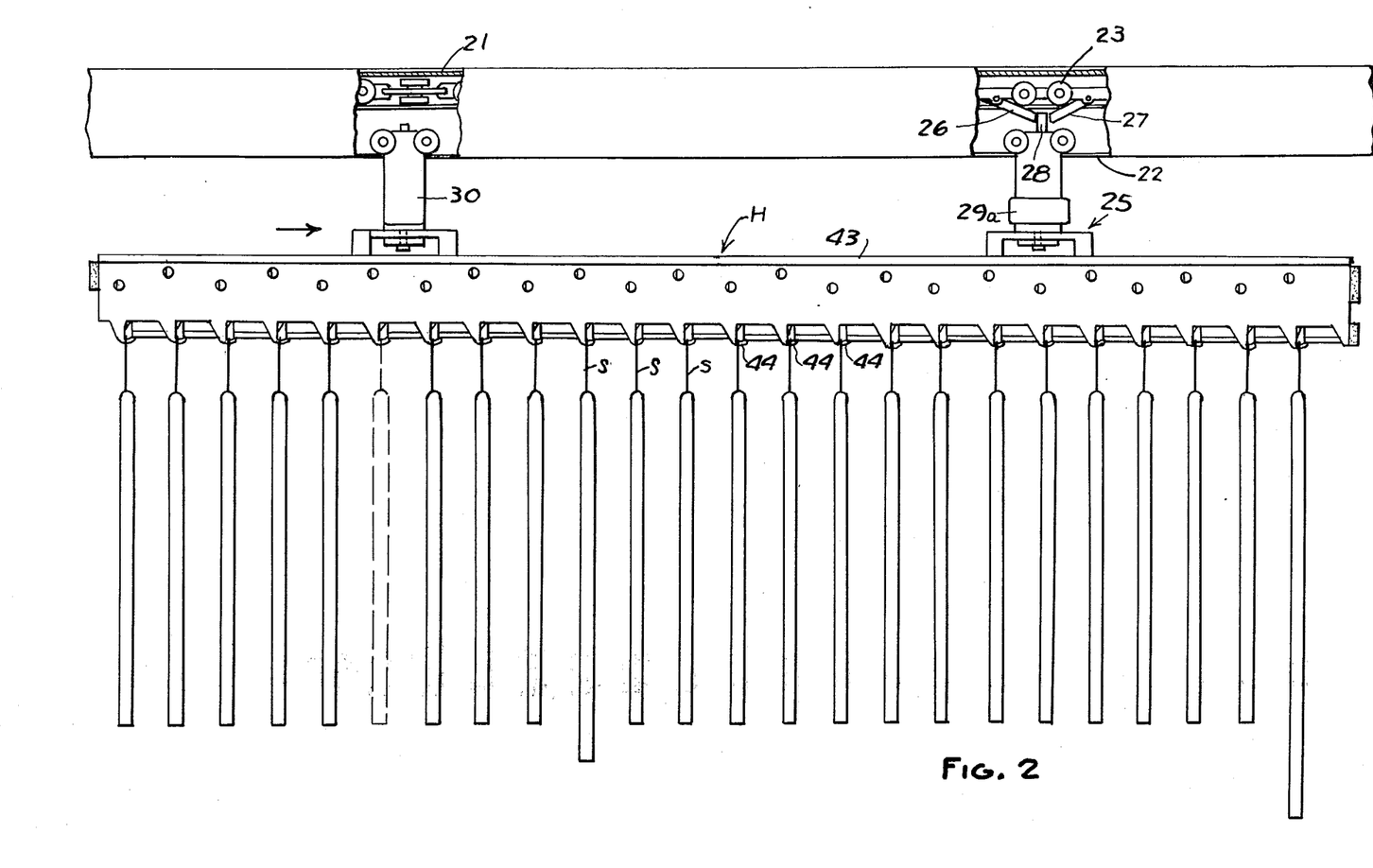
FIG. 2 is a part sectional elevational view of a portion of the system.

Referring to FIG. 2, each carrier H includes the trolleys 29, 30 from which a carrier body 43 is pivotally suspended for rotation about the vertical axis of each trolley. Each carrier includes a plurality of longitudinally spaced hooks 44 which are movable, as presently described, between a position for supporting a hanger or the like and a position for releasing the hanger.

Figure 3:
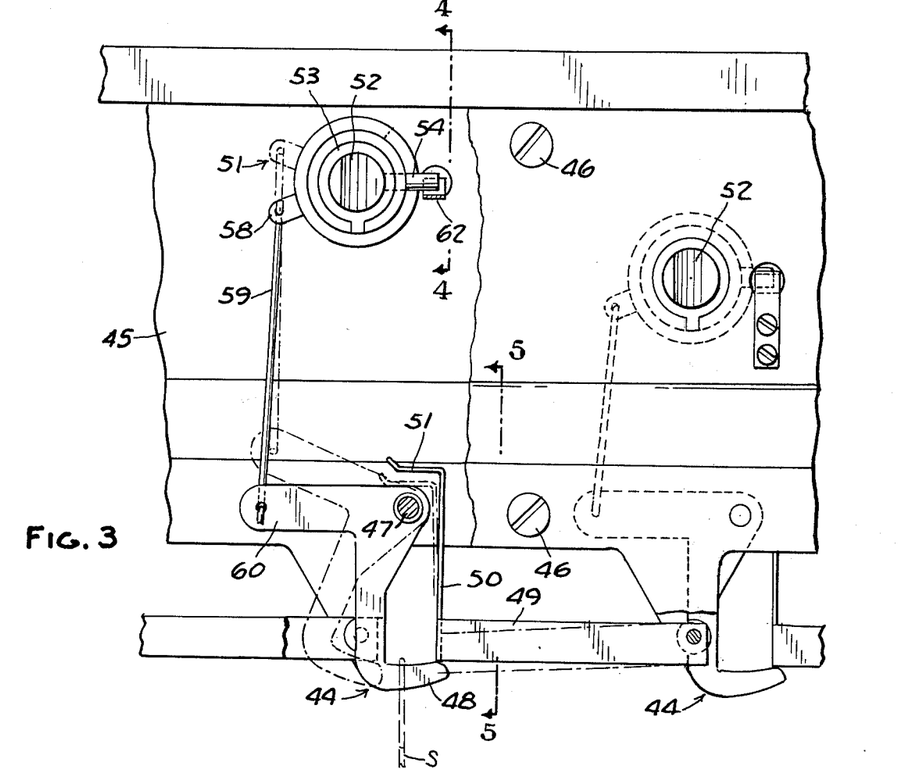
FIG. 3 is a fragmentary view on an enlarged scale of a carrier used in the system.
Figure 4:
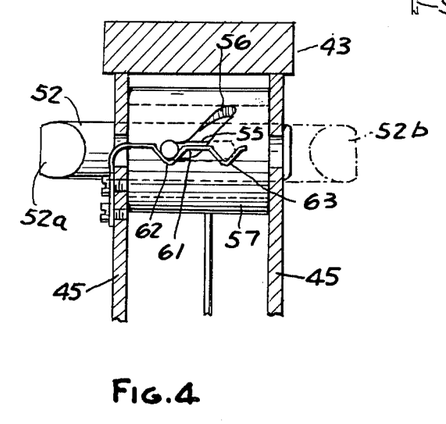
FIG. 4 is a fragmentary sectional view taken along the line 4—4 in FIG. 3.
Figure 5:
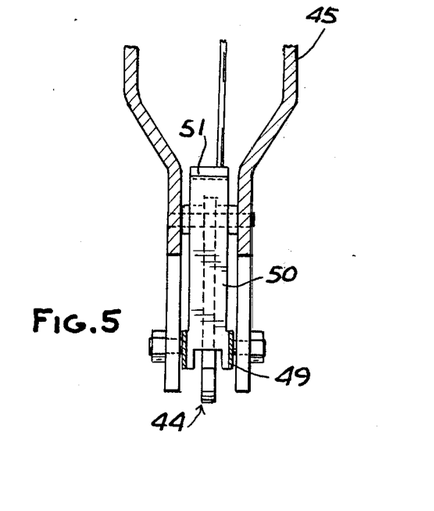
FIG. 5 is a fragmentary sectional view taken along the line 5—5 in FIG. 3.

Referring to FIGS. 3—5, each carrier body 43 includes spaced vertical plates 45 that are spaced apart by spacers 46. Each hook 44 is pivoted about a pin 47 extending between the plates 45 and has a lower portion 48 that is movable from the solid line position shown in FIG. 3 to the broken line position shown in FIG. 3 so that in the solid line position, it will support a hanger S, while in the broken line position, it will release the hanger S.

In order to prevent the hanger S from being inadvertently released because of movement of the carrier up or down inclined portions of the tracks, a pivoted latch 49 is provided that engages the end of the portion 48 to hold the hanger in position. The latch 49 is prevented from moving downwardly when the hook is pivoted to the broken line position by a retainer 50 fixed thereto that has a portion 51 engaging the pin 47.

In order to control the movement of the hook 44 between the two positions thereof, an actuator 51 is provided and includes a shaft 52 that is supported between the plates by a bushing 53. The shaft includes a pin 54 extending through a slot 55 in bushing 53 so that the shaft can be moved horizontally or transversely with respect to the carrier body but will not rotate relative thereto. The pin 54 extends through a helical slot 56 of a sleeve 57 over the bushing 53 so that as the shaft 52 is moved transversely, it will rotate the sleeve 57. Sleeve 57 includes a radial projection 58 that is connected by a link 59 to an arm 60 on the hook 44. In one position of the sleeve 57, the hook is in garment retaining position, while in another position as shown in broken lines in FIG. 3, the hook is in garment releasing position. The control of the two positions depends upon the position of the shaft 52. Thus, as shown in FIG. 4, the shaft holds the hook in garment retaining position.

Leaf spring 61 is provided on one wall 45 and includes spaced recesses 62, 63 that define detents.

The movement of the shaft 52 to a broken line or releasing positioning is controlled by a release mechanism along the path of the carrier at each discharge station and, as shown in FIGS. 6 and 7, each release mechanism 65 comprises a housing 66 supporting solenoids 67, 68 herein shown as rotary solenoids. Each solenoid acruates an arm 69 having a roller 70, 71 thereon so that when the solenoid is actuated, the roller 70, 71 is moved by the solenoid against the action of return spring 69a or 69b into the path of the end of the shaft 52 which is beveled as at 52a to move the shaft to the broken line position and, in turn, pivot the hook 44 to the open or garment releasing position.

In order to return the shaft 52 to the original position after the garment has been released and thereby return the hook to its position for receiving another garment, a fixed projection 72 is provided along the conveyor downstream from the discharge stations to engage the opposite beveled end 52b and return the shaft and, in turn, the hook to their original positions.

In order to minimize the longitudinal spacing of garments on the carrier, the shafts 52 are staggered so that alternate shafts are at the same level and adjacent shafts are at different horizontal levels. Thus, at each station, the release mechanism preferably includes two solenoids 67, 68, one for the top row of shafts 52 and the other for the bottom row of shafts 52 of each carrier.

Figure 13:
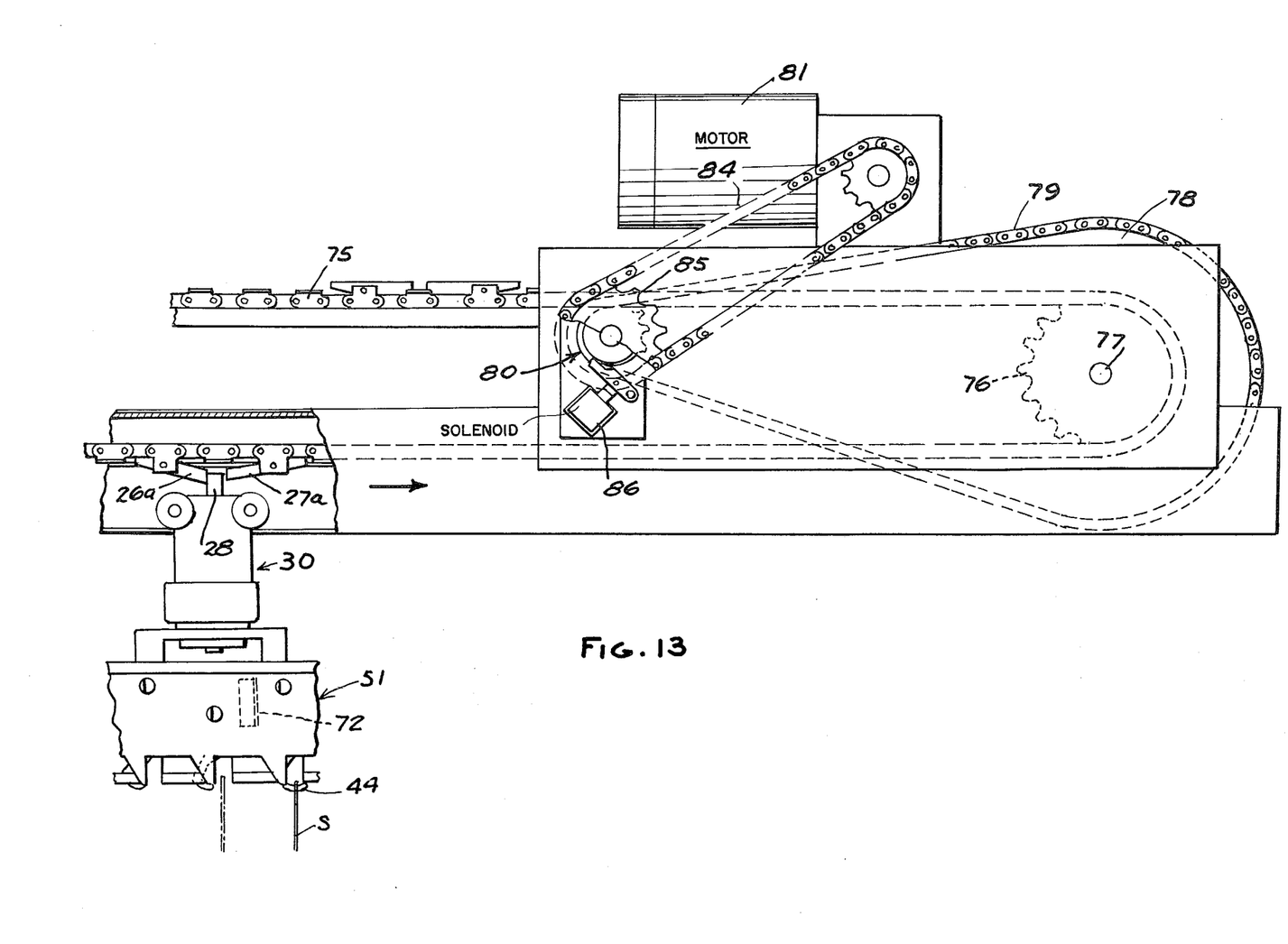
FIG. 13 is a fragmentary part sectional view of an indexing mechanism used in the system.

Each of the indexing conveyors 37, 39 shown diagrammatically in FIG. 1 is substantially identical and for clairty only one shall be described. Referring to FIG. 13, each of the indexing conveyors includes an endless conveyor chain 75 trained over sprockets 76 and having dogs 26a, 27a at longitudinally spaced points which function to engage the pusher dog 28 of the carrier.

The intermittent movement of the conveyor 75 is achieved through intermittent drive to the shaft 77 of sprocket 76 through a sprocket 78 fixed thereto and chain 79 extending to the output of a clutch 80. The input to the clutch 80 is from a motor 81 through a gear reducer 82 and sprockets 83, 85 over which a chain 84 is trained. The clutch is actuated by a solenoid 86 so that each time it is actuated the clutch output rotates through one revolution thereby indexing the conveyor a predetermined distance.

In the case of the loading conveyor 36, the solenoid 86 is energized by foot pedal 36a.

Figure 12:
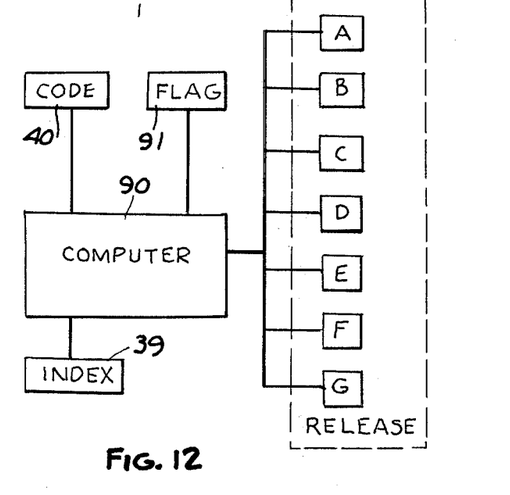
FIG. 12 is a block diagram of a portion of the control circuit.

In the case of the coding conveyor 39, the indexing is controlled by a computer 90 (FIG. 12).

Figure 9:
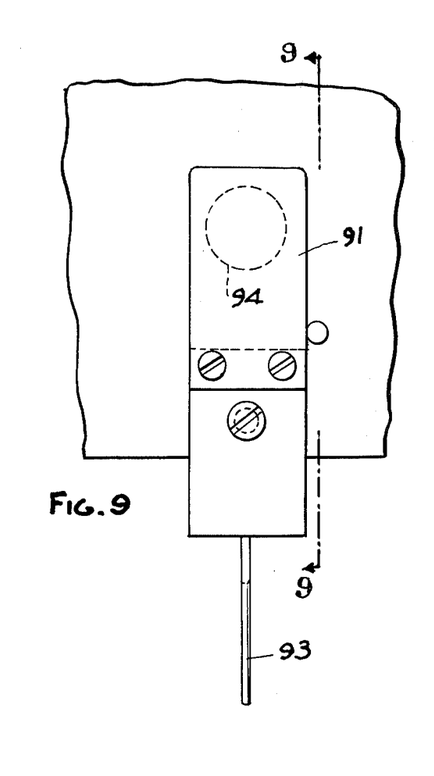
FIG. 9 is a fragmentary side elevational view of a portion of the system.
Figure 10:
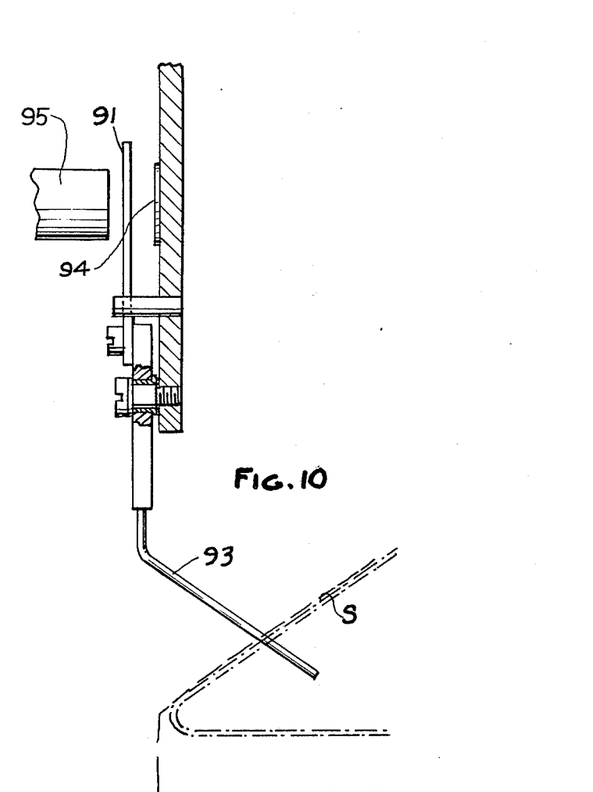
FIG. 10 is a fragmentary sectional view taken along the line 10—10 in FIG. 9.
Figure 11:
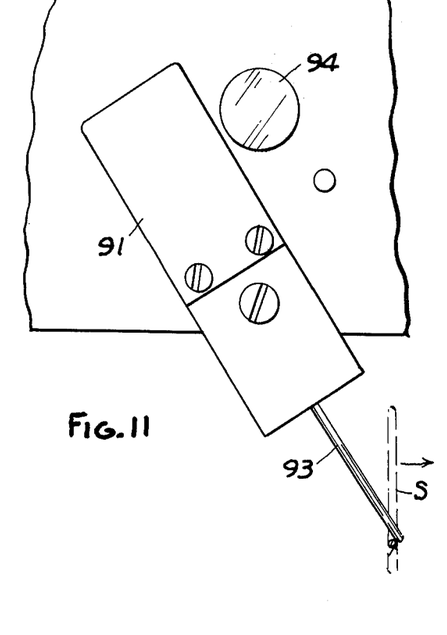
FIG. 11 is a view similar to FIG. 10 showing the parts in a different operative position.

When the operator is coding the computer, he reads a tag or other indicia on the garment. In order to prevent a flase signal in the event that there is no garment on a particular hook, a coding flag is provided as shown in FIGS. 9–11 and includes a body 91 pivoted for rotation about a pin 92. The lower end of the body is formed with an arm 93 that is in the path of the clothes hanger S. The upper portion of the body 91 normally overlies a reflector 94 which is aligned with a reader in the form of a photocell 95 so that the photocell 95 normally does not see the reflector 94. However, when the indexing conveyor brings a garment S past the operator at the coding station, the flag is pivoted, as shown in FIG. 11, exposing the reflector 94 so that the photocell will view or read the reflector and produce a signal. This signal is transmitted to the computer to indicate to the computer that the code which has been manually placed by the operator will be entered into the computer. If the flag is not actuated, then the computer will not register the code but will hold it for the next garment or hanger which actuates the flag.

The manner in which the control is achieved is shown in FIG. 12 wherein the computer 90 must receive a signal from the code entering mechanism 40 as well as from the flag 91 before it will enter the code and before it will permit a signal to pass to the solenoid for indexing the indexing conveyor 39. The code in the computer will be retained in the memory thereof until the carrier reaches one of the stations A–G at which time the release mechanism at the stations A–G will be actuated in accordance with the code to release a garment.

A shaft encoder 95 on the main drive train assures a precise positioning relationship between a given garment on the power chain and the garment's computer code. (i.e. 1 rev. of encoder equals 64 inches of chain travel)

We claim:

1. In a hanging goods sorter, the combination comprising
 a power and free conveyor system including a power track,
 a power conveyor movable along said track,
 and a free track movable along a portion of said power track,
 a gravity track connected at one end to said free track and at the other end to a spaced portion of said free track,
 a loading station along said gravity track,
 a coding station along said gravity track,
 a plurality of delivery stations along said portion of said free track which is along said power track,
 and a plurality of carriers,
 each said carrier having a plurality of longitudinally spaced supporting hooks thereon,
 means on each said carrier for individually actuating said hooks between a position for carrying hanging goods to a position for releasing hanging goods,
 and means at fixed points adjacent said delivery stations for actuating said last-mentioned means to release said hanging goods on individual hooks at predetermined delivery stations,
 coding means at said coding station,
 a computer,
 said computer having memory means for receiving a signal from said coding means,
 and program means associated with said computer such that upon application of a coding signal, said computer will record said signal and, in turn, produce an appropriate release signal at the predetermined station to release the hanging goods from said carrier.

2. The combination set forth in claim 1 wherein said loading and coding stations include an indexing conveyor,
 each said indexing conveyor comprising an endless conveyor having means thereon adapted to interengage each said carrier,
 and means for selectively moving said endless conveyor at increments at the loading and coding stations thereby permitting loading and coding by an operator as the carriers are indexed past the station.

3. The combination set forth in claim 2 including means at said coding station for inhibiting the trasmittal of a signal from said coding means to said memory means when hanging goods are absent from a hook of said carrier.

4. The combination set forth in claim 3 wherein said inhibiting means comprises a flag movably supported at said coding station and adapted to expose a reflective portion upon passage of a hook having hanging goods thereon,
 and a reader adapted to produce a signal when said reflective portion is exposed,
 said reader being connected to said computer.

5. In a hanging goods sorter, the combination comprising
 a power and free conveyor system including a power track,
 a power conveyor movable along said track,
 and a free track movable along a portion of said power track,
 a gravity track connected at one end to said free track and at the other end to a spaced portion of said free track,
 a loading station along said gravity track,
 a coding station along said gravity track,
 a plurality of delivery stations along said portion of said free track which is along said power track,
 and a plurality of carriers,
 coding means at said coding station,
 a computer,
 said computer having memory means for receiving a signal from said coding means,
 and program means associated with said computer such that upon application of a coding signal, said computer will record said signal and, in turn, produce an appropriate release signal at the predetermined station to release hanging goods from each said carrier,
 each said carrier having hooks pivoted thereto at longitudinally spaced points along the length of the carrier,
 means individual to each said hook for moving said hook between a hanging goods holding position and a hanging goods releasing position,
 said moving means having portions thereof extending beyond the confines of the carrier,
 and release means at fixed points adjacent said delivery stations each including a portion projectable upon signal into the path of said portions of said last-mentioned means which project beyond the confines of the carrier to release the hook by moving the hook to a releasing portion.

6. The combination set forth in claim 5 including means along said free track for returning said means for moving said hook to a position wherein said hook is in said hanging goods holding position.

7. The combination set forth in claim 5 wherein said moving means includes a shaft mounted in said carrier for movement horizontally.

8. The combination set forth in claim 7 wherein said shaft has in one position a portion extending to one side of said carrier, and in another position a portion extending outwardly beyond the other side of the carrier.

9. The combination set forth in claim 8 including means interconnecting said shaft and one of said hooks such that when the shaft is moved horizontally transversely of the carrier, the one hook is moved between said hanging goods holding position and said hanging goods releasing position.

10. The combination set forth in claim 9 wherein said means interconnecting said shaft and said one hook comprises a sleeve surrounding said shaft,
 and a pin extending radially from said shaft,
 said sleeve having a helical slot therein such that transverse movement of said shaft and said pin causes rotation of said sleeve between a first and second position,
 and means interconnecting said sleeve and said one hook so that rotation of said sleeve between said first and second positions moves the one hook between said hanging goods holding position and said hanging goods releasing position.

11. The combination set forth in claim 10 wherein said means interconnecting said sleeve and said one hook comprises a link interconnecting said sleeve and said one hook.

12. The combination set forth in claim 11 including a second sleeve interposed between said first-mentioned sleeve and said shaft,
 said second sleeve having a transverse slot therein through which said pin on said shaft extends such that said second-mentioned sleeve prevents the shaft from rotating as the shaft is moved transversely.

13. The combination set forth in claim 12 including means resiliently holding said first-mentioned sleeve in at least one of said first and second positions.

14. The combination set forth in claim 13 wherein said last-mentioned means resiliently holding said sleeve comprises a spring member having spaced recesses therein engaged by said pin.

15. The combination set forth in claim 9 wherein said release means at each said station comprises a roller at each said station and means for projecting said roller into and out of the path of the shaft on said carrier.

16. The combination set forth in claim 15 wherein said means for projecting said roller comprises a solenoid.

17. The combination set forth in claim 16 including means for resetting said release means to its original position and returning said hook to its hanging goods supporting position comprising a member in the path of said shaft.

18. A carrier for a hanging goods sorter system comprising a plurality of longitudinally spaced supporting hooks theron, said carrier having the hooks thereof pivoted thereto at longitudinally spaced points along the length of the carrier, means individual to each said hook for moving said hook between a hanging goods holding position and a hanging goods releasing position, said last-mentioned means for moving said hook having portions thereof extending beyond the confines of the carrier to release the hook by moving the hook to a releasing position, said moving means including a shaft for each said hook mounted in said carrier for movement horizontally, said shaft having in one position a portion extending to one side of said carrier, and in another position a portion extending outwardly beyond the other side of the carrier, means interconnecting said shaft and said hook such that when the shaft is moved horizontally transversely of the carrier, the hook is moved between said hanging goods holding position ans said hanging goods releasing position, said means interconnecting said shaft and said hook comprising a sleeve surrounding said shaft, and a pin extending radially from said shaft, said sleeve having a helical slot therein such that transverse movement of said shaft and said pin causes rotation of said sleeve, and means interconnecting said sleeve and said hook so that rotation of said sleeve moves the hook between said hanging goods holding position and said hanging goods releasing position.

19. The combination set forth in claim 18 wherein said means interconnecting said sleeve and said hook comprises a link interconnecting said sleeve and said hook.

20. The combination set forth in claim 18 including a second sleeve interposed between said first-mentioned sleeve and said shaft, said second sleeve having a transverse slot therein through which said pin on said shaft extends such that said second-mentioned sleeve prevents the shaft from rotating as the shaft is moved transversely.

21. The combination set forth in claim 20 including means resiliently holding said first-mentioned sleeve in at least one of said first and second positions.

22. The combination set forth in claim 21 wherein said last-mentioned means resiliently holding said sleeve comprises a spring member having spaced recesses therein engaged by said pin.

23. The combination set forth in claim 22 including release means comprising a roller and means for projecting said roller into and out of the path of each shaft on said carrier.

24. The combination set forth in claim 23 wherein said means for projecting said roller comprises a solenoid.

25. The combination set forth in claim 24 including means for resetting said shaft to its original position and returning said hook to its hanging goods supporting position comprising a member in the path of said shaft.

* * * * *